United States Patent
Lee et al.

(10) Patent No.: US 7,310,116 B2
(45) Date of Patent: Dec. 18, 2007

(54) CAMERA SUPPORT STRUCTURE OF VIDEO PRESENTER AND VIDEO PRESENTER ADOPTING THE SAME

(75) Inventors: Seung-yeob Lee, Seongnam-si (KR); Shigeru Onawa, Tokyo (JP); Joo-bok Kim, Kwangju-si (KR)

(73) Assignee: Samsung Techwin Co., Ltd. (KR)

( * ) Notice: Subject to any disclaimer, the term of this patent is extended or adjusted under 35 U.S.C. 154(b) by 726 days.

(21) Appl. No.: 10/436,317

(22) Filed: May 12, 2003

(65) Prior Publication Data

US 2004/0233325 A1    Nov. 25, 2004

(30) Foreign Application Priority Data

May 11, 2002    (KR) .................... 10-2002-0026024

(51) Int. Cl.
*H04N 5/225*    (2006.01)
(52) U.S. Cl. .................... 348/373; 248/187.1
(58) Field of Classification Search ........ 348/373, 348/374, 375, 207.99; 248/187.1, 918, 177.1, 248/278.1; 396/428, 419; 353/71, 119, 353/79; 358/449, 450, 906
See application file for complete search history.

(56) References Cited

U.S. PATENT DOCUMENTS 5,933,191 A * 8/1999 Ariga et al. ............. 348/373

6,300,975 B1 * 10/2001 Yamane .................. 348/63

FOREIGN PATENT DOCUMENTS

| CN | 2424476 | 3/2001 |
|---|---|---|
| CN | 2472042 | 1/2002 |
| JP | H 7-107377 | 4/1995 |
| JP | H 9-65056 | 3/1997 |

OTHER PUBLICATIONS

Chinese Office Action; Nov. 18, 2005; 8 pages.

* cited by examiner

*Primary Examiner*—Lin Ye
*Assistant Examiner*—Nelson D. Hernandez
(74) *Attorney, Agent, or Firm*—Tuchman & Park LLC (57) ABSTRACT

A camera support structure of a video presenter includes a first support rod having one end portion rotatably installed with respect to a main body of the video presenter, a second support rod rotatably extended from the other end portion of the first support rod, a first joint portion maintaining the first support rod rotatable with respect to the main body of the video presenter, a second joint portion maintaining the first support rod and the second support rod rotatable between 0° through 180° with respect to each other and elastically supporting the first support rod and the second support rod with respect to each other, and a third joint portion maintaining a camera rotatable with respect to the other end portion of the second support rod and elastically supporting the second support rod and the camera with respect to each other.

11 Claims, 8 Drawing Sheets

CAMERA SUPPORT STRUCTURE OF VIDEO PRESENTER AND VIDEO PRESENTER ADOPTING THE SAME

CROSS-REFERENCES TO RELATED APPLICATIONS

This application claims priority from Korean Patent Application No. 2002-26024 filed on May 11, 2003 in the Korean Intellectual Property Office, the disclosure of which is incorporated herein in its entirety by reference.

BACKGROUND OF THE INVENTION

1. Field of the Invention

The present invention relates to a camera support structure of a video presenter, and more particularly, to an improved camera support structure of a video presenter which can rotatably support a camera, and a video presenter adopting the camera support structure.

2. Description of the Related Art

In general, video presenters photograph an object by using a CCD camera and display the photographed object on a monitor, and are widely used for educational and industrial purposes. Typical video presenters can display a magnified image of a tiny object on the monitor by using a lens unit like a microscope lens coupled to a CCD camera which photographs the object. A variety of peripheral devices are included in such video presenters. For example, an apparatus for illuminating an object to improve sharpness of an image to be displayed through a monitor is additionally provided.

In such video presenters, a structure for supporting the CCD camera can be made to have a variety of shapes. A preferable support structure of the video presenter must allow access to an object at variety of angles so that the image of the photographed object is most effectively displayed. That is, such support structure of the video presenter has a degree of freedom with multi-axes. However, conventional video presenters have a limited degree of freedom and thus an angle of photographing an object is limited.

According to an example of the conventional technology, one or two support rods are fixedly installed at one side of the table where an object is placed and a camera head is fixed to an end portion of the support rod. According to this fixing manner, a camera can be stably maintained. However, if the object has a large volume or area, input of an image is inconvenient or limited.

In another example of the conventional technology, a support rod is installed to be inclined in a diagonal direction from one side of the table and a camera head is fixed to one end of the support rod. In this example, although the size of the table where an object is placed can be made small, accurate matching of a camera with the center of the table is difficult and a plurality of additional parts are needed to compensate therefor.

Japanese Patent Publication No. H 7-107377 discloses a video presenter having two support rods supporting a camera and rotatable by using joints. That is, a first support rod is rotatable with respect to a table and a second support rod while the second support rod is rotatable with respect to the first support rod and the camera. However, in this video presenter, the camera must be inconveniently separated and kept when the video presenter is not in use. Also, the first and second support rods are rotated only to the same direction. Thus, when the second support rod accesses the table, the second support rod is not appropriately folded onto the table due to the volume of the camera.

In the above Japanese patent, when the support rods are rotated, a lock button performing a locking operation must be involved. That is, a user must press the lock button to release the locking operation so as to rotate the support rods. Further, the camera may fall on a main body unless the camera or support rods are supported by a hand when the lock button is pressed. Thus, there is a possibility to cause damage to the main body and it is inconvenient to use.

SUMMARY OF THE INVENTION

To solve the above and other problems, the present invention provides an improved camera support structure of a video presenter and a video presenter adopting the camera support structure.

The present invention provides a camera support structure of a video presenter which can be conveniently used and kept, and a video presenter adopting the camera support structure.

The present invention provides a camera support structure of a video presenter which can freely change the support position of the camera, and a video presenter adopting the camera support structure.

According to an aspect of the present invention, a video presenter having a camera support structure, comprises a first support rod having one end portion rotatably installed with respect to a main body of the video presenter, a second support rod rotatably extended from the other end portion of the first support rod, a first joint portion for rotatably connecting the first support rod with respect to the main body of the video presenter, a second joint portion for connecting the first support rod and the second support rod rotatable between 0° through 180° with respect to each other and elastically supporting the first support rod and the second support rod with respect to each other, and a third joint portion for rotatably connecting a camera with respect to the other end portion of the second support rod and elastically supporting the second support rod and the camera with respect to each other.

The second joint portion comprises a first shaft portion fixed to the other end of the first support rod and having a ring type shaft protruding from a bottom surface of a cylindrical portion, a first shaft receiving portion fixed to one end portion of the second support rod and having an accommodation hole formed in a bottom surface of a cylindrical portion to accommodate the ring type shaft of the shaft portion, a first fixing plate fixed with respect to the ring type shaft of the first shaft portion from an inner side of the bottom surface of the cylindrical portion of the first shaft receiving portion, and a ring spring arranged between the inner side of the bottom surface of the cylindrical portion of the first shaft receiving portion and the first fixing plate.

An outer side of the bottom surface of the cylindrical portion of the first shaft portion faces an outer side of the bottom surface of the cylindrical portion of the first shaft receiving portion.

The camera support structure further comprises a first friction ring arranged between the outer side of the bottom surface of the cylindrical portion of the first shaft portion and the outer side of the bottom surface of the cylindrical portion of the first shaft receiving portion.

The camera support structure further comprises a second friction ring arranged between the inner side of the bottom surface of the cylindrical portion of the first shaft receiving portion and the ring spring.

A guide protruding portion is formed in an arc shape on a surface of the ring type shaft of the first shaft portion, and a guide groove into which the guide protruding portion is inserted is formed in the fixing plate.

The third joint portion comprises a second shaft portion having a camera fixing bracket integrally formed with the second shaft portion and fixed to the camera and having a ring type shaft protruding from the bottom surface of the cylindrical portion, a second shaft receiving portion fixed to the other end of the second support rod and having an accommodation hole formed in a cylindrical portion to accommodate the ring type shaft, a second fixing plate fixed with respect to the ring type shaft of the second shaft portion from an inner side of the bottom surface of the cylindrical portion of the second shaft receiving portion, and a spring arranged between the inner side of the bottom surface of the cylindrical portion of the second shaft receiving portion and the second fixing plate.

The spring has a half ring shape and includes a curved protruding portion protruding from a flat surface of the spring.

A spring accommodation groove to accommodate the spring is formed in the inner side of the bottom surface of the cylindrical portion of the second shaft receiving portion.

A ball plunger is installed at the bottom surface of the cylindrical portion of the second shaft receiving portion, and a ball of the ball plunger is inserted into a concave portion formed in the second fixing plate.

The camera support structure further comprises a third friction ring arranged between an outer side of the bottom surface of the cylindrical portion of the second shaft portion and an outer side of the bottom surface of the cylindrical portion of the second shaft receiving portion.

According to anther aspect of the present invention, a video presenter comprises: a camera; a table for placing an object to be photographed by the camera; and a camera support member for supporting the camera with respect to the table, where the camera support member includes: a first support member connecting relative to the table and rotatable in a first direction; and a second support member connecting relative to the first support member and rotatable in a second direction opposite to the first direction. The rotation of the second support member relative to the first support member is limited between about 0° and about 180°. The camera support member preferably includes frictional elements for providing friction to at least one or all of rotating junctions between the second support member and the first support member, between the camera and the second support member, and between the first support member and the table.

BRIEF DESCRIPTION OF THE DRAWINGS

The above features of the present invention will become more apparent by describing in detail preferred embodiments thereof with reference to the attached drawings in which.

DETAILED DESCRIPTION OF THE DRAWINGS

Figure 1:
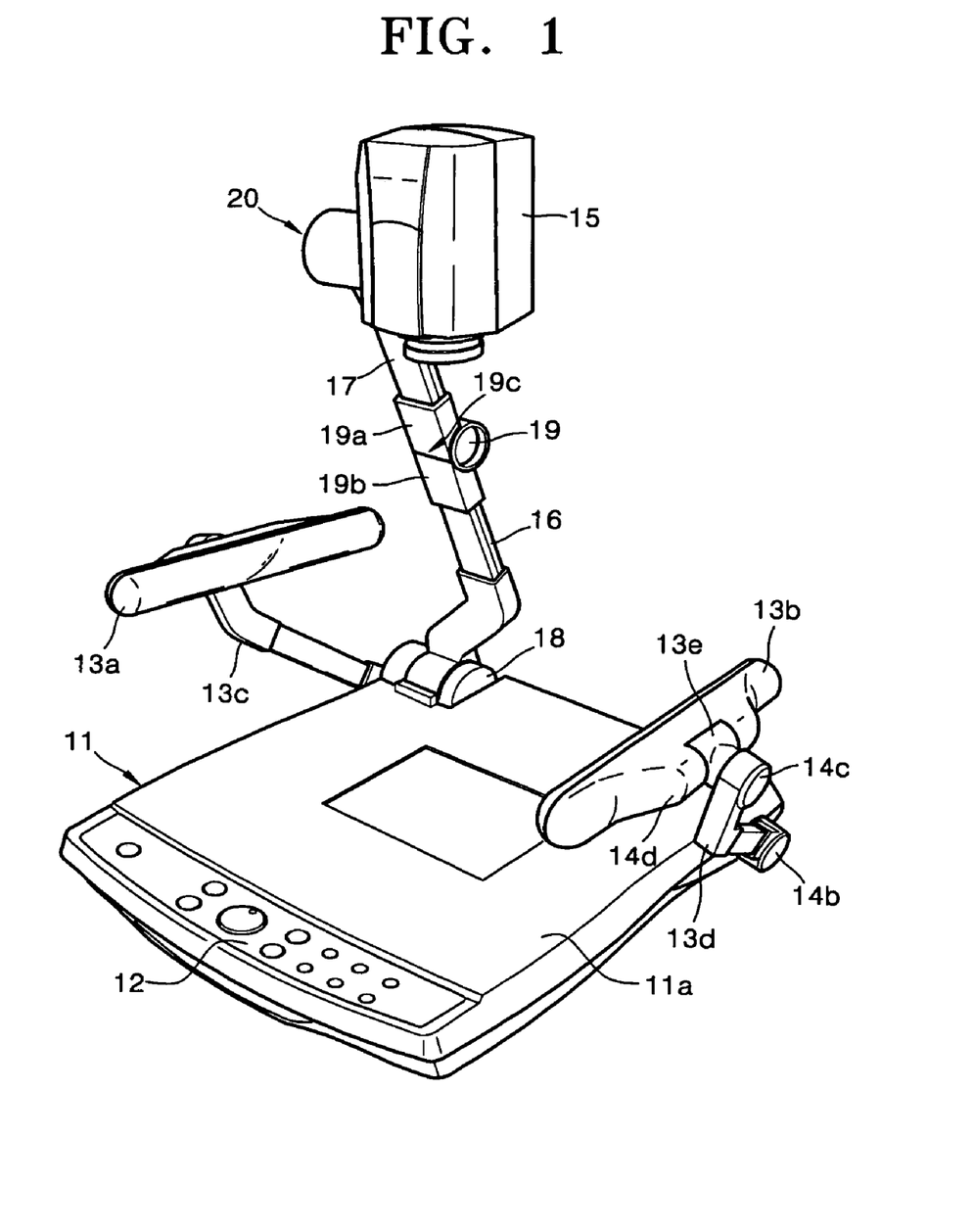
FIG. 1 is a perspective view illustrating a video presenter according to a preferred embodiment of the present invention.

Referring to FIG. 1, a video presenter according to a preferred embodiment of the present invention includes a main body 11 having a table 11a on which an object to be photographed is placed, a first illumination light 13a and a second illumination light 13b installed at both sides of the main body 11, and a camera head portion 15 supported by a first support rod 16 and a second support rod 17 extending from the main body 11.

Electronic circuit control portions to process and control all the operations of the video presenter is included in the main body 11 of the video presenter. A control panel 12 is provided at one side of an upper surface of the main body 11. A user can control all functions of the video presenter by manipulating switches on the control panel 12.

The first and second illumination lights 13a and 13b illuminate the object to be photographed which is placed on the table 11a. The first and second illumination lights 13a and 13b are supported by illumination light support rods 13c, 13d, and 13e. As shown in the drawing, only the support rod 13c is shown for installation of the first illumination light 13a while the first illumination light support rod 13d and the second illumination light support rod 13e are shown for the second illumination light 13b. However, it should be noted that an additional support rod (not shown) corresponding to the second illumination light support rod 13e is provided to the first illumination light 13a.

As shown in the drawing, one end portion of the first illumination light support rod 13d is rotatably connected to the side surface of the main body 11 via the joint portion 14b. The other end portion of the first illumination light support rod 13d is rotatably connected to the second illumination light support rod 13e via a joint portion 14c. Also, the second illumination light support rod 13e is rotatably connected to the second illumination light 13b via a joint portion 14d.

The same connection structure is applied to the first illumination light 13a. The second illumination light 13b can be moved to an arbitrary position by operation of the joint portions 14b, 14c, and 14d and the first and second illumination light support rods 13d and 13e. In particular, when the support rods 13d and 13e are rotated to most closely approach the table 11a, the bottom surface of the second illumination light 13b is positioned near to the table 11a in the lengthwise direction, which can be seen clearly in FIG. 10.

One end portion of the first support rod 16 is rotatably installed on the table 11a via the first joint portion 18. The other end portion of the first support rod 16 is rotatably installed at one end portion of the second support rod 17 via the second joint portion 19. The other end portion of the second support rod 17 supports the camera head portion 15 which is capable of rotating via a third joint portion 20.

Figure 2:
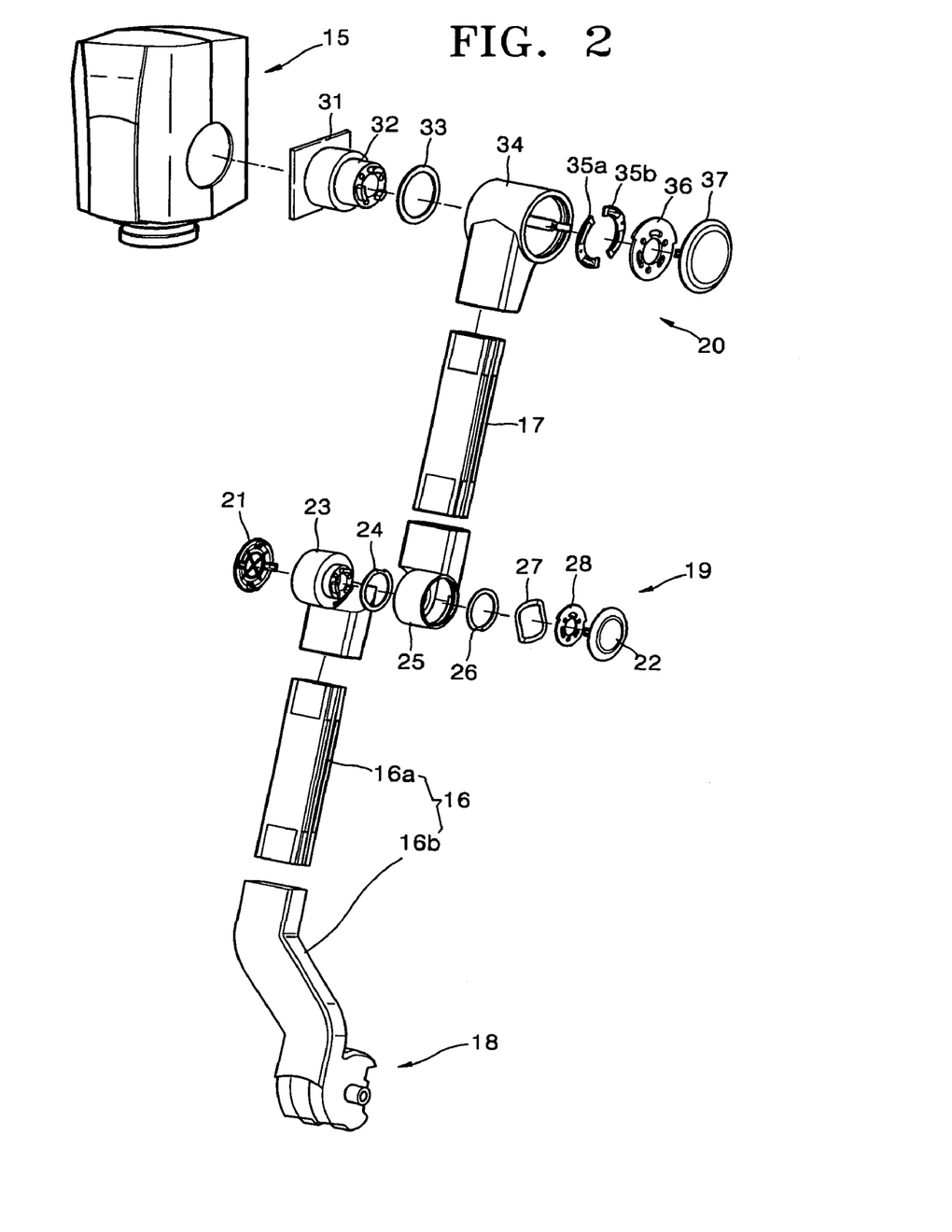
FIG. 2 is an exploded perspective view illustrating a camera support structure of a video presenter shown in FIG. 1.

FIG. 2 shows the details of the camera support structure shown in FIG. 1. Referring to FIG. 2, the camera support structure includes: the first support rod 16 having two support members 16a and 16b with one end thereof installed at the main body 11 of FIG. 1 which is capable of rotating via the first joint portion 18; and the second support rod 17 rotatably extended with respect to the other end portion of the first support rod 16. The camera support structure further includes: the second joint portion 19 having a shaft portion 23 rotatably connecting the other end portion of the first support rod 16 and one end portion of the second support rod 17, and a shaft receiving portion 25; and a third joint portion 20 having a shaft portion 32 integrally formed with a camera fixing bracket 31 and a shaft receiving portion 34 fixed to one end portion of the second support rod 17 for maintaining a camera 15 (FIG. 1) rotatably with respect to the other end portion of the second support rod 17.

The first and second support rods 16 and 17 preferably have cavities inside and the second and third joint portions 19 and 20 are preferably formed with hollow insides as well. Such hollow shapes serve as a passage for extending various electricity cables including a power cable leading from the main body 11 to the camera 15. Although the first support rod 16 is shown to have two support members 16a and 16b, the first support rod 16 can be formed of a single member.

The second joint portion 19, as shown in the drawing, includes the shaft portion 23, part of which is cylindrically formed to have a cup shape, and the shaft receiving portion 25. A shaft protruding from the shaft portion 23 is rotatably accommodated in the shaft receiving portion 25 through a shaft accommodation groove formed in the shaft receiving portion 25. This arrangement can be clearly seen from FIG. 3 showing the shaft portion and the shaft receiving portion.

Figure 3:
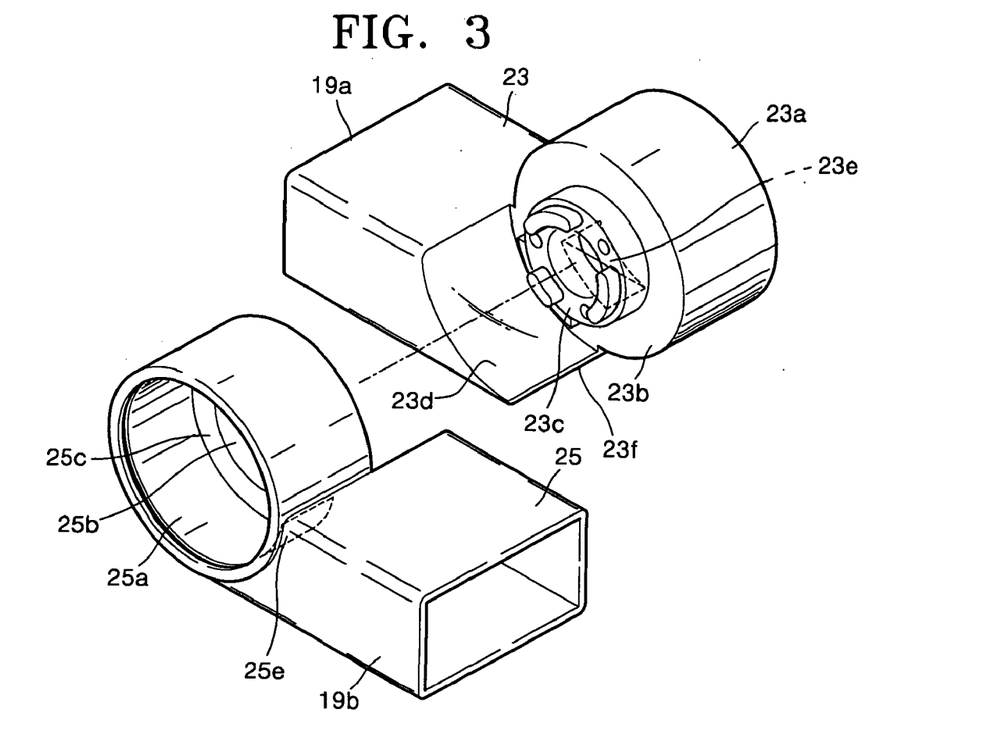
FIG. 3 is an exploded perspective view illustrating part of a second joint portion shown in FIG. 2.

Referring to FIG. 3, a cylindrical portion 23a is formed in the shaft portion 23 and a ring type shaft 23c protrudes from a bottom surface 23b of the cylindrical portion 23a. The cylindrical portion 23a has a cup shape such that one end portion thereof is closed as a whole and the other end portion is completely open. The bottom surface 23b refers to the closed end portion.

A cylindrical portion 25a having a cup shape is formed at the shaft receiving portion 25. An accommodation groove 25b accommodating the ring type shaft 23c is formed at a bottom surface 25c of the cylindrical portion 25a. That is, the outer side of the bottom surface 23b of the cylindrical portion 23a formed at the shaft portion 23 faces the outer side of the bottom surface 25c of the cylindrical portion 25a of the shaft receiving portion 25. The ring type shaft 23c protruding from the outer side of the bottom surface 23b is accommodated in the accommodation groove 25b formed in the corresponding bottom surface 25c. Here, the cylindrical portion 25a of the shaft receiving portion 25 corresponds to a curved surface 23d formed close to the cylindrical portion 23a at the shaft portion 23. A curved surface 63 shown in FIG. 6 formed close to the cylindrical portion 25a of the shaft receiving portion 25 corresponds to the cylindrical portion 23a.

Reference numeral 23e at the shaft portion denotes a cable pass hole through which cables pass. Reference numeral 25e at the shaft receiving portion 25 denotes a cable pass hole through which cables pass. Cables extended from the main body 11 are extended through the cable pass holes 23e and 25e. When the shaft portion 23 and the shaft receiving portion 25 are connected, the cables passing through the cable pass hole 23e can enter the cable pass hole 25e through a hole formed at the center of the cylindrical portion 23a and a hole formed at the center of the corresponding cylindrical portion 25a.

Figure 4:
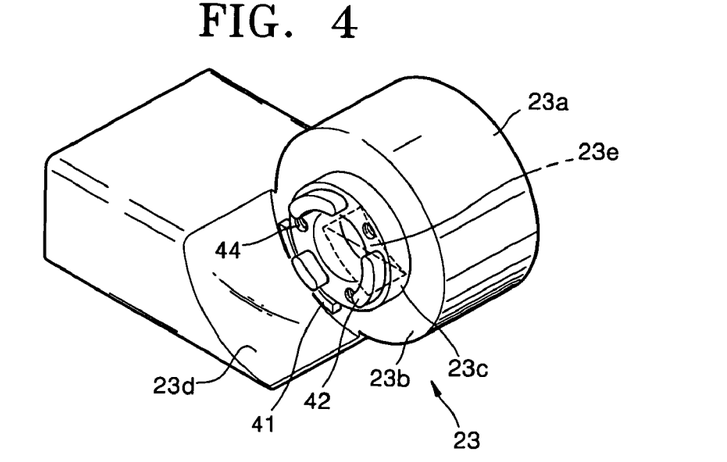
FIG. 4 is a perspective view illustrating a shaft portion of the second joint portion of FIG. 3.

FIG. 4 is a perspective view illustrating the shaft portion 23. Referring to the drawing, the ring type shaft 23c protrudes from the outer side of the bottom surface 23b of the cylindrical portion 23a. Three guide protruding portions 42 are formed on the upper surface of the ring type shaft 23c. The guide protruding portions 42 are extended forming an arc along a circumference. Screw holes 44 are formed between the guide protruding portions 42. The guide protruding portions 42 are to guide a fixing plate 28 (FIGS. 2 and 5) to a correct position, which will be described later. The screw holes 44 are used to fix the fixing plate 28 to the ring type shaft 31.

A protrusion 41 is formed in an arc shape on the bottom surface 23b. The protrusion 41 is inserted in an insertion groove 61 shown in FIG. 6, to be described later, formed at the outer side of the bottom surface 25c of the cylindrical portion 25a of the shaft receiving portion 25 to perform a guide function during rotation.

Figure 5:
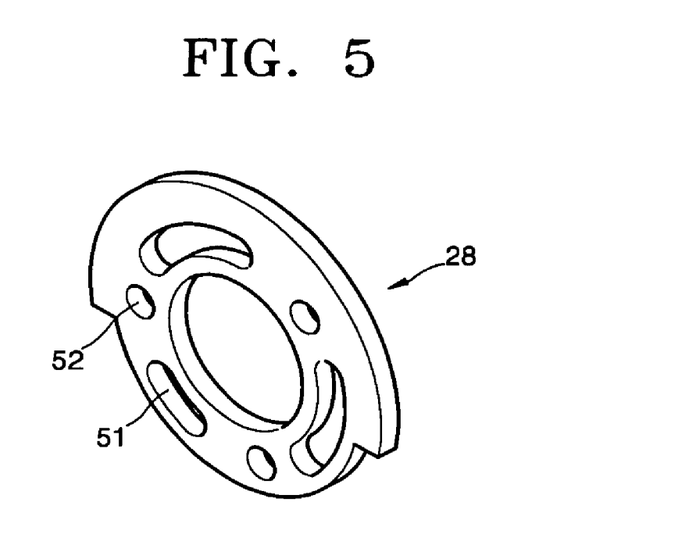
FIG. 5 is a perspective view illustrating a fixing plate of the second joint portion of FIG. 2.

FIG. 5 is a perspective view illustrating the fixing plate. Referring to the drawing, the fixing plate 28 has a hole at the center thereof and is circular as a whole. The fixing plate 28 is arranged next to the inner side of the bottom surface 25c of the cylindrical portion 25a of the shaft receiving portion 25c, as shown in FIG. 3, and fixed to the ring type shaft 23c using a screw. Thus, since the edge of the fixing plate 28 is caught along the inner side of the bottom surface 25c of the shaft receiving portion 25, the ring type shaft 23c cannot escape from the accommodation groove 25b. As a result, a coupling state between the shaft portion 23 and the shaft receiving portion 25 is maintained. In FIG. 5, a plurality of guide grooves 51 and a plurality of screw holes 52 are formed in the fixing plate 28. The guide protruding portions 42 of FIG. 4 are inserted in the guide grooves 51 while the screw holes 52 correspond to the screw hole 44 of FIG. 4.

Figure 6:
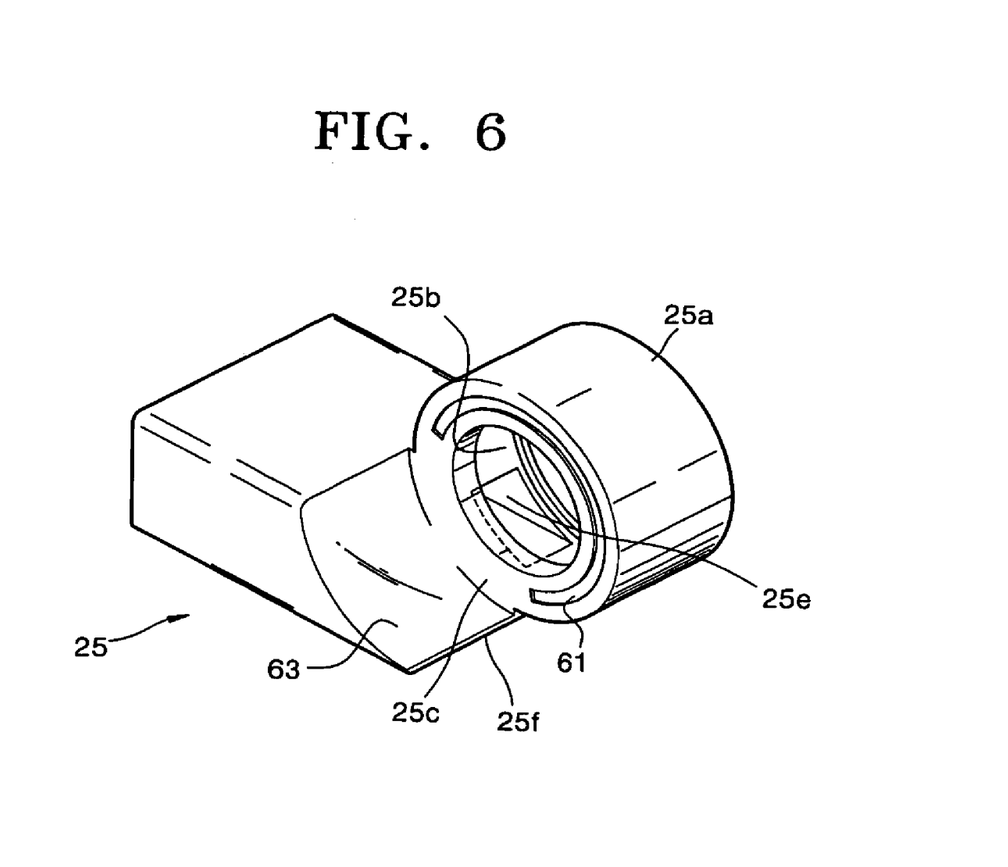
FIG. 6 is a perspective view illustrating a shaft receiving portion shown in FIG. 3.

FIG. 6 is a perspective view illustrating the shaft receiving portion 25, viewed from a direction different from that of FIG. 3.

Referring to FIG. 6, the insertion groove 61 is formed in an arc shape in the outer side of the bottom surface 25c of the cylindrical portion 25a. The protrusion 41 of FIG. 4 is inserted into the insertion groove 61. Relative rotation between the shaft portion 23 and the shaft receiving portion 25 is guided by the interaction between the protrusion 41 and the insertion groove 61. Also, the curved surface 63 is formed close to the cylindrical portion 25a. The curved surface 63 corresponds to the cylindrical portion 23a of the shaft portion 23 shown in FIG. 3.

Since the cylindrical portion 23a of the shaft portion 23 corresponds to the curved surface 63 of the shaft receiving portion 25 shown in FIG. 6, and since the cylindrical portion 25a of the shaft receiving portion 25 corresponds to the curved surface 23d of the shaft portion 23 shown in FIG. 3, when the shaft portion 23 and the shaft receiving portion 25 are coupled, a joint capable of rotating in one direction is formed. That is, when a body 19a of the shaft portion 23 and a body 19b of the shaft receiving portion 25 shown in FIG. 3 are coupled, the bodies 19a and 19b form a flat surface, as shown in FIG. 1. In other words, an edge 23f shown in FIG. 3 meets an edge 25f shown in FIG. 6 to form a plane indicated with an arrow 19c in FIG. 1. Thus, the second support rod 17 can rotate with respect to the first support rod 16 within a range of 180° through 0° in a direction separated from the table 11a. In other words, the first support rod 16 prevents the second support rod 17 from being rotated toward the table 11a, thus it prevents the camera 15 from being contacted to the table 11a.

Referring back to FIG. 2, the second joint portion 19 may be clearly understood based on the above descriptions of major constituent elements of the second joint portion 19 with reference to FIGS. 3 through 6. The second joint portion 19 includes the shaft portion 23, the shaft receiving portion 25 accommodating the shaft portion 23 inside, the fixing plate 28 fixed to the shaft portion 23 on the inner side of the bottom surface 25c of the cylindrical portion 25a shown in FIG. 3 of the shaft receiving portion 25, and a ring spring 27 arranged between the inner side of the bottom surface 25c of the cylindrical portion 25a of the shaft receiving portion 25 and the fixing plate 28. An elastic force of the ring spring 27 restricts the rotation of the fixing plate 28 when an external force is not applied. Thus, the relative rotation between the shaft portion 23 and the shaft receiving portion 25 is restrained. That is, the ring spring 27 applies an elastic force between the fixing plate 28 and the bottom surface 25c of the cylindrical portion 25a of the shaft receiving portion 25 so that the shaft receiving portion 25 and the shaft portion 23 are not rotated. Thus, to rotate the shaft receiving portion 25 and the shaft portion 23, an external force overcoming the elastic force must be applied.

A first friction ring 24 is arranged between the outer side of the bottom surface 23b of the cylindrical portion 23a of the shaft portion 23 and the outer side of the bottom surface 25c of the cylindrical portion 25a of the shaft receiving portion 25. A second friction ring 26 is arranged between the inner side of the bottom surface 25c of the cylindrical portion 25a of the shaft receiving portion 25 and the ring spring 27. The first and second friction rings 24 and 26 minimize noise and abrasion generated during rotation. Also, covers 21 and 22 are provided to close the open portions of the cylindrical portions 23a and 25a of the shaft portion 23 and the shaft receiving portion 25.

Referring to FIG. 2, the third joint 20 includes the shaft portion 32 integrally formed with the camera fixing bracket 31 fixed to a frame (not shown) of the camera 15, the shaft receiving portion 34 accommodating the shaft portion 32, a fixing plate 36 facing the inner side of the bottom surface of a cylindrical portion of the shaft receiving portion 34 and fixed to the shaft portion 32, and springs 35a and 35b arranged between the inner side of the bottom surface of the cylindrical portion of the shaft receiving portion 34 and the fixing plate 36. A friction ring 33 is arranged between the bottom surface of a cylindrical portion of the shaft portion 32 and the outer side of the bottom surface of the cylindrical portion of the shaft receiving portion 34.

The basic structure of the third joint portion 20 is similar to that of the second joint portion 19. The shaft portion 32 of the third joint portion 20 is similar to the shaft portion 23 of the second joint portion 19. The shaft receiving portion 34 of the third joint portion 20 is similar to the shaft receiving portion 25 of the second joint portion 19. The structure of the third joint portion 20 will be described below in detail with reference to FIGS. 7A through 9.

Figure 7A:
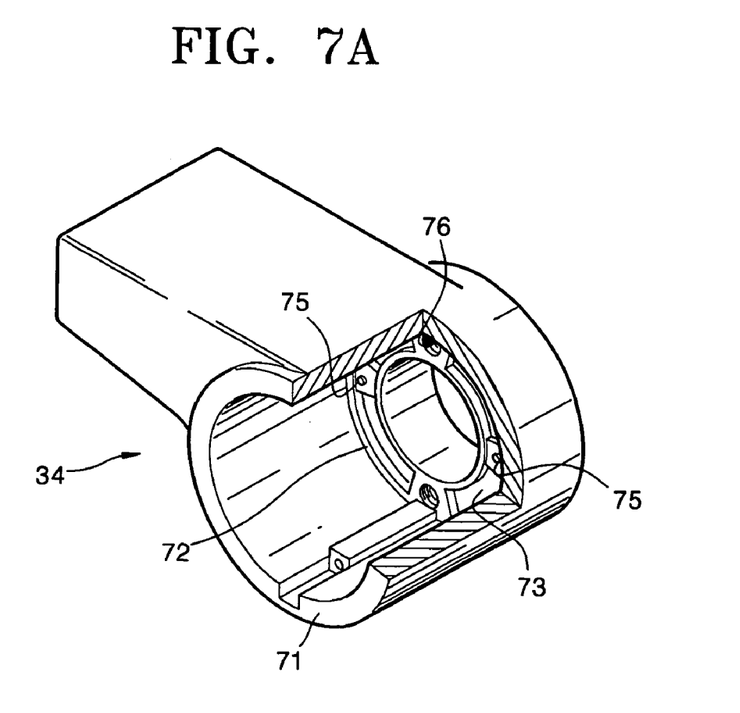
FIGS. 7A and 7B are perspective views illustrating a shaft receiving portion of a third joint portion shown in FIG. 2.
Figure 7B:
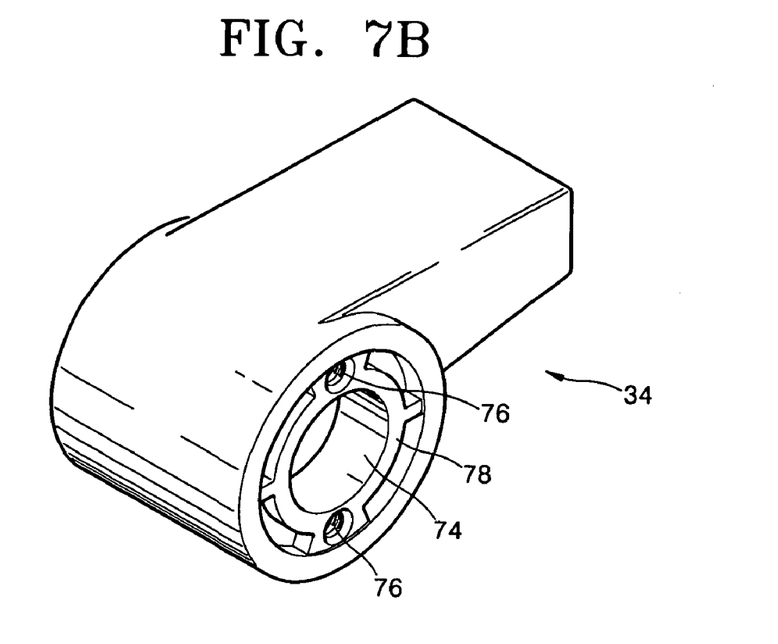

FIGS. 7A and 7B are perspective views illustrating the shaft receiving portion 34 of the third joint portion 20 shown in FIG. 2. FIG. 7A shows an inner side of a bottom surface of the cylindrical portion while FIG. 7B shows an outer side of a bottom surface of the cylindrical portion.

Figure 8:
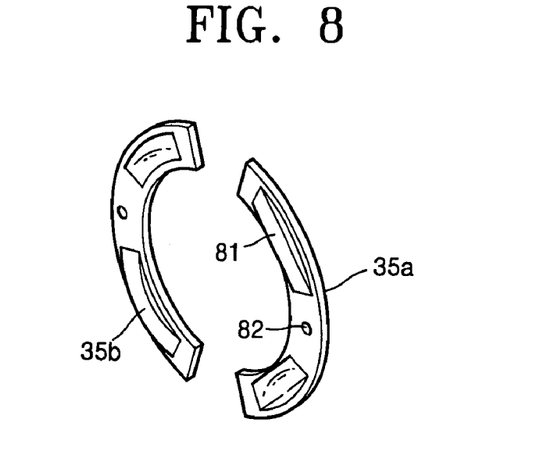
FIG. 8 is a perspective view illustrating a spring of the third joint portion of FIG. 2.

Referring to FIG. 7A, the shaft receiving portion 34 is formed to have a cylindrical cup shape. An accommodation hole 74 accommodating the shaft portion 32 shown in FIG. 2 of the third joint portion 20 is formed at the center of a bottom surface 72 which is a closed side of the cylindrical portion 71. The bottom surface 72 is ring shaped and a spring accommodation groove 73 is formed along the outer circumference of the bottom surface 72. A spring to be described with reference to FIG. 8 is accommodated in the spring accommodation groove 73. Also, ball plunger installation holes 76 are formed on the bottom surface 72. A ball plunger (not shown) which is well known is installed in the ball plunger installation hole 76. The ball plunger controls the position of the shaft portion 32 shown in FIG. 2 during rotation thereof as balls of the ball plunger is inserted in or escapes from a plurality of concave portions 97 shown in FIG. 9 formed in the fixing plate 36 shown in FIGS. 2 and 9. A cover 37 shown in FIG. 2 is coupled to the other open end portion of the cylindrical portion 71.

Referring to FIG. 7B, the outer side of the bottom surface 72 faces the shaft portion 32 integrally formed with the camera fixing bracket 31. The ball plunger installation hole 76 is formed in the bottom surface 72.

FIG. 8 is a perspective view illustrating the spring. Referring to the drawing, each of the springs 35a and 35b has a half ring shape and a hole 82 and a curved protruding portion 81 are formed respectively in the middle of and at both ends of each spring. The curved protruding portion 81 protrudes from flat surfaces of the springs 35a and 35b. When the curved protruding portion 81 is pressed, an elastic force is generated by a reaction to the press.

The springs 35a and 35b shown in FIG. 8 are accommodated in the spring accommodation grooves 73 shown in FIG. 7. Protrusions 75 formed on the bottom surface 72 are inserted in the holes 82 of the springs 35a and 35b. The curved protruding portions 81 are accommodated in the spring accommodation grooves 73.

Figure 9:
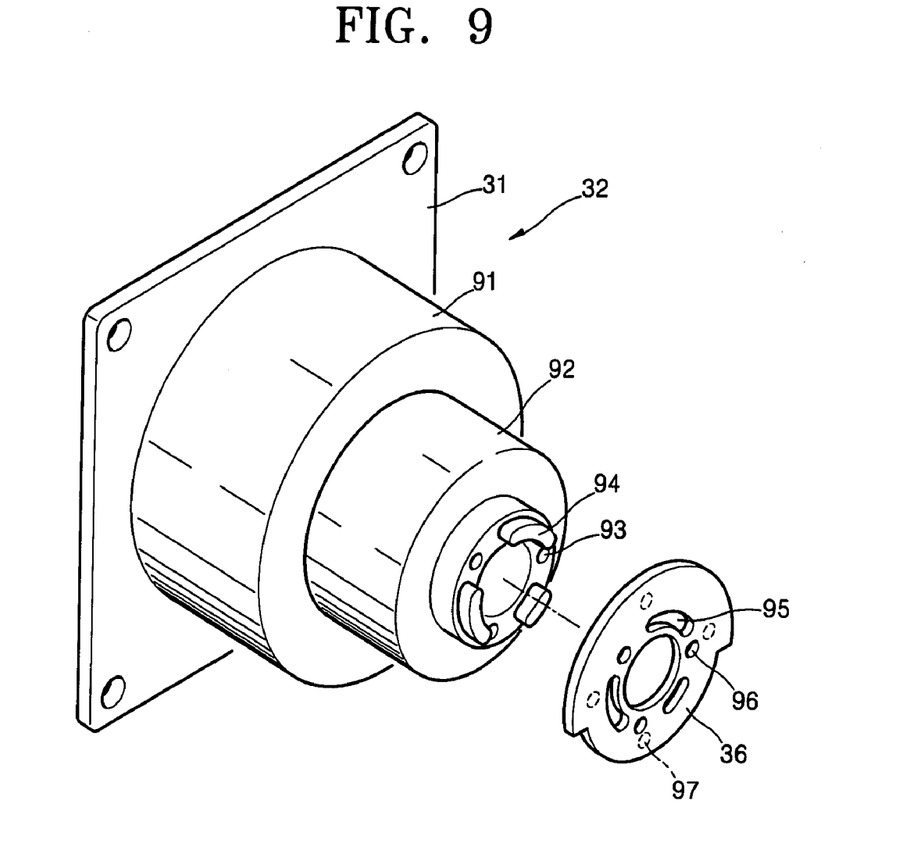
FIG. 9 is an exploded perspective view illustrating the shaft portion and a fixing plate fixed thereto shown in FIG. 2.

FIG. 9 is a magnified perspective view illustrating the shaft portion and the fixing plate coupled to the shaft portion in the third joint portion 20.

Referring to the drawing, in the shaft portion 32 of the third joint portion 20, the camera fixing bracket 31 is integrally formed at one side thereof, as described with reference to FIG. 2, and a cylindrical portion 91 with a ring type shaft 92 accommodated in the accommodation hole 74 shown in FIGS. 7A and 7B is formed on the other side thereof. The ring type shaft 92 protrudes from one side of the cylindrical portion 91. Three guide protruding portions 94 are formed in arc shapes on the surface of the ring type shaft 92. A plurality of screw holes 93 are formed between the guide protruding portions 94.

The fixing plate 36 to be coupled to the shaft portion 32 is circular as a whole. A plurality of guide grooves 95 into which the guide protruding portions 94 are inserted and a plurality of screw holes 96 corresponding to the screw holes 93 are formed in the fixing plate 36. Also, as shown in FIG. 9, the shallow concave portions 97 into which the balls of the ball plunger (not shown) are accommodated are formed at a predetermined angle in the rear surface of the fixing plate 36.

As shown in FIGS. 2, 7A, and 7B, the shaft portion 32 and the fixing plate 36 are assembled as follows. The ring type shaft 92 of the shaft portion 32 is inserted into the accommodation hole 74 from the outer side of the bottom surface 72 of the cylindrical portion 71 of the shaft receiving portion 34. The fixing plate 36 is inserted into the inner side of the bottom surface 72 of the cylindrical portion 71 of the shaft receiving portion 34. As the screw holes 93 of the ring type shaft 92 and the screw holes 96 of the fixing plate 36 are coupled by screws, the shaft portion 32 and the fixing plate 36 are coupled. Thus, when the shaft portion 32 and the fixing plate 36 are screw coupled, since an edge of the fixing plate 36 is hooked by the bottom surface 72 of the cylindrical portion 71 of the shaft receiving portion 34, the shaft portion 32 cannot be separated from the shaft receiving portion 34.

Since the springs 35a and 35b are arranged between the fixing plate 36 and the bottom surface 72 of the shaft receiving portion 34, when no external force is applied, a force to support the fixing plate 36 and the bottom surface 72 of the shaft receiving portion 34 is generated by an elastic force of the springs 35a and 35b so that rotation of camera 15 can be prevented. A user can rotate the camera 15 by applying an external force beyond the elastic force of the springs 35a and 35b.

The ball plunger (not shown) is installed in the ball plunger installation hole 76 shown in FIGS. 7A and 7B. The balls (not shown) can be inserted in the concave portions 97 formed in the fixing plate 36. While a user rotates the camera 15, he feels the insertion of balls into the concave portions 97 by the sense of a finger. Preferably, the rotation of the camera 15 is maintained at a position where the balls are inserted into the concave portions 97.

Figure 10:
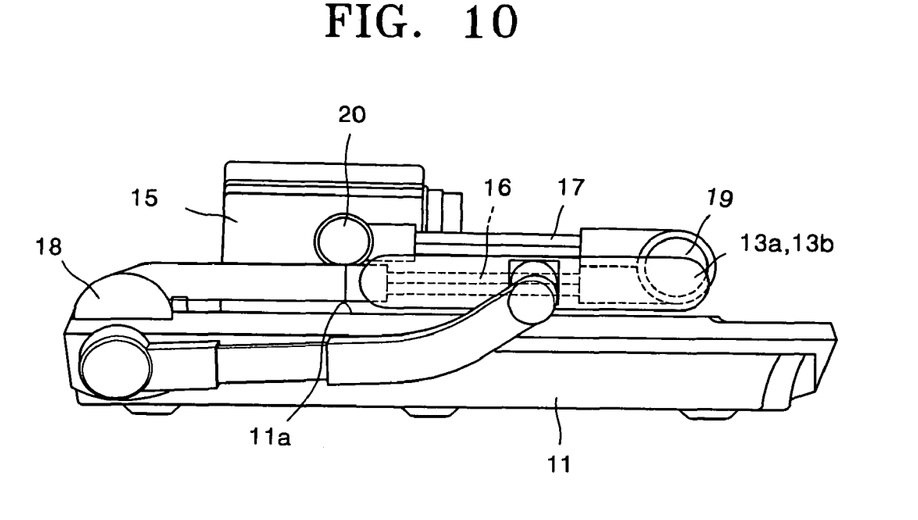
FIG. 10 is a side view illustrating the video presenter of FIG. 1 which is kept for storage.

FIG. 10 is side view illustrating a state of the video presenter shown in FIG. 1 being in storage. Referring to FIG. 10, the first support rod 16 is folded onto the main body 1 with respect to the first joint portion 18, in a clockwise direction on the drawing. The second support rod 17 is counterclockwise folded with respect to the second joint portion 19. Also, the camera 15 is disposed parallel to the second support rod 17 by being folded with respect to the third joint portion 20.

As shown in FIG. 10, the first and second support rods 16 and 17 can be folded close to the surface of the table 11a of the main body 11. Also, the camera 15 is folded close to the table 11a. Thus, the video presenter can be kept in a minimum volume.

Figure 11:
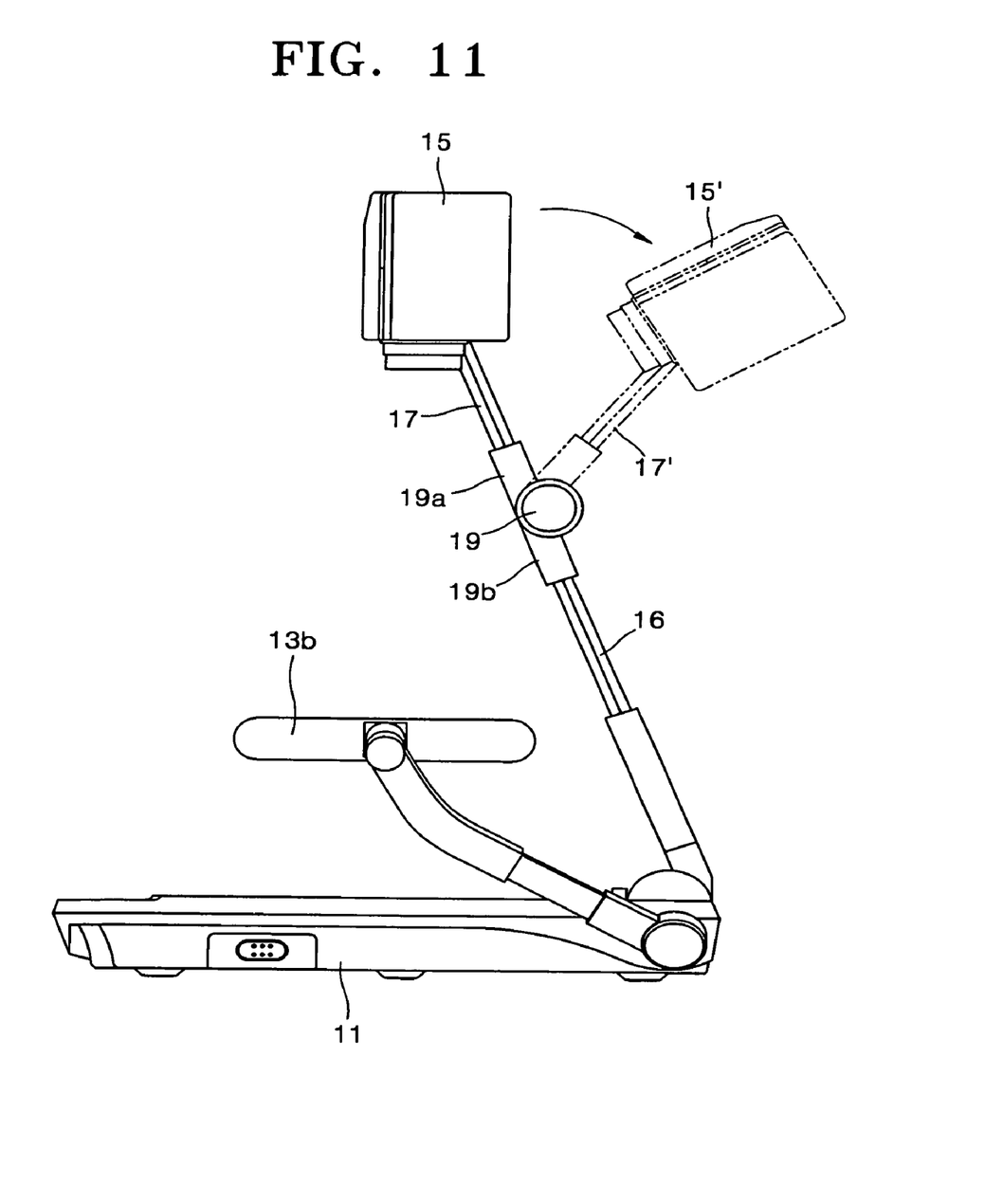
FIG. 11 is a side view illustrating the video presenter which is in operation position.

FIG. 11 is a side view illustrating an operation state of the video presenter. Referring to the drawing, the video present is in an operation state as the first and second support rods 16 and 17 are extended in a line. The second support rod 17 can be rotated backward with respect to the second joint portion 19, which is indicated by imaginary lines. That is, as indicated by reference numerals 15' and 17', the camera head portion and the second support rod are rotatable backward so that the video presenter is turned to a keeping state as shown in FIG. 10.

As described above, in the camera support structure of a video presenter according to the present invention and the video presenter adopting the same, since the support rods and the camera can be arranged most close to a flat surface of the table, the video presenter is conveniently kept. Also, the structure of the joints is designed to be easily handled so that photographing of an object can be performed at an appropriate position. Furthermore, the support rods can be maintained at arbitrary angles by operation of the springs of joint portions unless an external force is applied. Thus, a user can use the video presenter without damage to the camera and the main body, thus improving convenience in use.

While this invention has been particularly shown and described with reference to preferred embodiments thereof, it will be understood by those skilled in the art that various changes in form, structures, mechanisms and details may be made therein without departing from the spirit and scope of the invention as defined by the appended claims.

What is claimed is:

1. A video presenter having a camera support structure, comprising:
    a first support rod having one end portion rotatably installed with respect to a main body of the video presenter;
    a second support rod rotatably extended from the other end portion of the first support rod;
    a first joint portion for rotatably connecting the first support rod with respect to the main body of the video presenter;
    a second joint portion for connecting the first support rod and the second support rod rotatable between 0° through 180° with respect to each other and elastically supporting the first support rod and the second support rod with respect to each other;
    a third joint portion for rotatably connecting a camera with respect to the other end portion of the second support rod and elastically supporting the second support rod and the camera with respect to each other; and
    wherein the second joint portion comprises:
    a shaft portion fixed to the other end of the first support rod and having a ring type shaft protruding from a bottom surface of a cylindrical portion of the shaft portion;
    a shaft receiving portion fixed to one end portion of the second support rod and having an accommodation hole formed in a bottom surface of a cylindrical portion of the shaft receiving portion to accommodate the ring type shaft of the shaft portion;
    a fixing plate fixed with respect to the ring type shaft of the shaft portion from an inner side of the bottom surface of the cylindrical portion of the shaft receiving portion; and
    a spring arranged between the inner side of the bottom surface of the cylindrical portion of the shaft receiving portion and the fixing plate.

2. The video presenter as claimed in claim 1, wherein an outer side of the bottom surface of the cylindrical portion of the shaft portion faces an outer side of the bottom surface of the cylindrical portion of the shaft receiving portion.

3. The video presenter as claimed in claim 1, further comprising a first friction ring arranged between the outer side of the bottom surface of the cylindrical portion of the shaft portion and the outer side of the bottom surface of the cylindrical portion of the shaft receiving portion.

4. The video presenter as claimed in claim 1, further comprising a second friction ring arranged between the inner side of the bottom surface of the cylindrical portion of the shaft receiving portion and the spring.

5. The video presenter as claimed in claim 1, wherein a guide protruding portion is formed in an arc shape on a surface of the ring type shaft of the shaft portion, and a guide groove into which the guide protruding portion is to be inserted is formed in the fixing plate.

6. A video presenter having a camera support structure, comprising:
    a first support rod having one end portion rotatably installed with respect to a main body of the video presenter;
    a second support rod rotatably extended from the other end portion of the first support rod;
    a first joint portion for rotatably connecting the first support rod with respect to the main body of the video presenter;
    a second joint portion for connecting the first support rod and the second support rod rotatable between 0° through 180° with respect to each other and elastically supporting the first support rod and the second support rod with respect to each other;
    a third joint portion for rotatably connecting a camera with respect to the other end portion of the second support rod and elastically supporting the second support rod and the camera with respect to each other;

wherein the third joint portion comprises:

a shaft portion having a camera fixing bracket integrally formed with the shaft portion and fixed to the camera and having a ring type shaft protruding from the bottom surface of the cylindrical portion of the shaft portion;

a shaft receiving portion fixed to the other end of the second support rod and having an accommodation hole formed in a cylindrical portion of the shaft receiving portion to accommodate the ring type shaft;

a fixing plate fixed with respect to the ring type shaft of the shaft portion from an inner side of the bottom surface of the cylindrical portion of the shaft receiving portion; and a spring arranged between the inner side of the bottom surface of the cylindrical portion of the shaft receiving portion and the fixing plate.

7. The video presenter as claimed in claim 6, wherein the spring has a half ring shape and includes a curved protruding portion protruding from a flat surface of the spring.

8. The video presenter as claimed in claim 7, wherein a spring accommodation groove to accommodate the spring is formed in the inner side of the bottom surface of the cylindrical portion of the shaft receiving portion.

9. The video presenter as claimed in claim 6, wherein a spring accommodation groove to accommodate the spring is formed in the inner side of the bottom surface of the cylindrical portion of the shaft receiving portion.

10. The video presenter as claimed in claim 6, wherein a ball plunger is installed at the bottom surface of the cylindrical portion of the shaft receiving portion, and a ball of the ball plunger is inserted into a concave portion formed in the fixing plate.

11. The video presenter as claimed in claim 6, further comprising a friction ring arranged between an outer side of the bottom surface of the cylindrical portion of the shaft portion and an outer side of the bottom surface of the cylindrical portion of the shaft receiving portion.

* * * * *